Nov. 2, 1954 R. B. BUCHNER 2,693,504

AUTOMATIC SIGNALING SYSTEM

Filed May 20, 1950

INVENTOR.
ROBERT BERTOLD BUCHNER
BY Fred M Vogel
AGENT

United States Patent Office 2,693,504

Patented Nov. 2, 1954

2,693,504

AUTOMATIC SIGNALING SYSTEM

Robert Bertold Buchner, Hilversum, Netherlands, assignor to Hartford National Bank and Trust Company, Hartford, Conn., as trustee

Application May 20, 1950, Serial No. 163,169

Claims priority, application Netherlands June 14, 1949

3 Claims. (Cl. 179—18)

Figure 1:
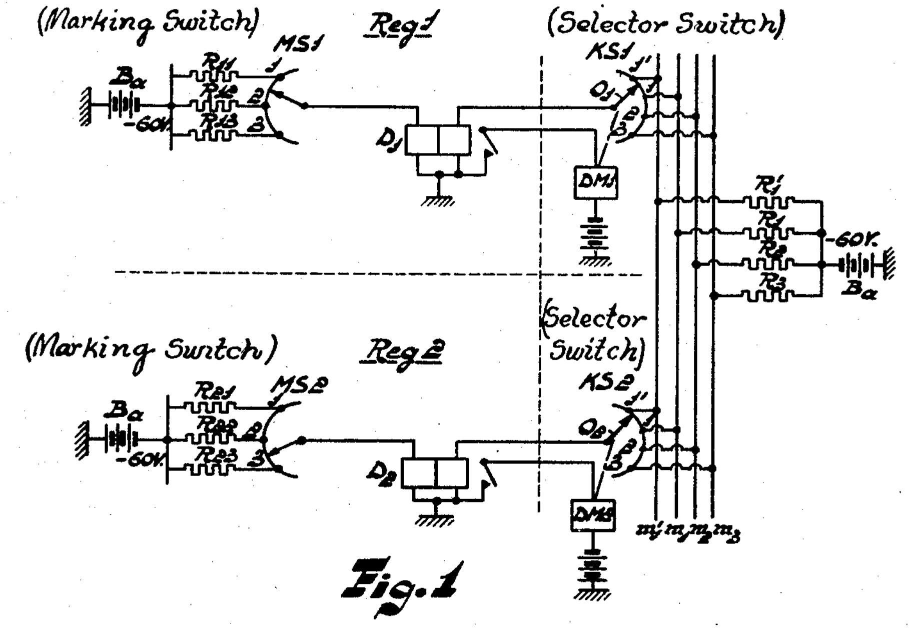

This invention relates to a circuit-arrangement in an automatic signalling system, for example an automatic telephone system, for selectively marking the outlets of a group of switches whose corresponding outlet contacts are multiplied.

It is known to distinguish different groups of outlets from one another by providing marking multiples of outlets, associated with different groups, with different electrical marks. (In the present case, the term multiples is to be understood to mean a set of multipled contacts, i. e. one contact of each outlet of each switch.) Outlets of one and the same group exhibit the same mark, whereas outlets of different groups have different marks.

Such a selective marking is utilized in known systems inter alia for the numerical adjustment of selector switches to an outlet corresponding to the desired number. The control-device of a switch (for example a register) tests the marks of the outlets by way of a wiper during the movement of the switch and arrests the latter as soon as an outlet is found with the mark which is characteristic of the desired number. If necessary, in order to mark the outlet engaged, the mark is subsequently varied so that it no longer corresponds to one of the numerical marks.

Selective marking may also be used to provide a distinction of a different nature between the various outlets. Thus, for example, line finders and final selectors may be provided with marks giving an indication about the nature of the lines connected to the outlets, public telephone booth, prepayment coin box, restricted service private branch exchange and so on.

The characteristic electric marks may be obtained by supplying voltages having different values to the marking multiples of the outlets or by connecting the marking multiples to impedances having different absolute values. The other end of the impedances may be connected to a common point, for example a point of constant potential or to a terminal of an alternating-voltage source or again to another multiple of the associated outlet.

If use is made of selective voltage marking, the same mark may be tested simultaneously through test wipers of two or more switches without disturbing the mark, provided that the internal resistance of the test circuits is sufficiently high.

An impedance marking the strength of the current flowing through the wiper is a measure of the absolute value of the identifying impedance. If the test wipers of two switches strike the mark contacts of the same multiple simultaneously, the current through the mark impedance is distributed over the test circuits, so that in each test circuit a current strength is developed which is not equal to the nominal value. As current flowing through one or through the two test circuits could then assume a value corresponding to the nominal value associated with another mark, one of the test circuits or both of them would respond incorrectly.

The invention obviates this disadvantage and is characterized in that the absolute value of the highest of the impedances is smaller than twice the absolute value of the lowest impedance.

Figure 2:
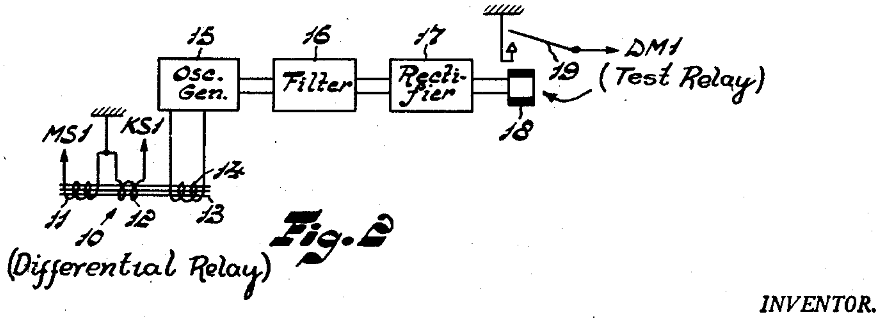

In order that the invention may be more clearly understood and readily carried into effect, it will now be described in detail with reference to the accompanying drawing wherein:

Fig. 1 shows in a simplified and schematic form one preferred embodiment of a circuit for the numerical adjustment of the selector switches according to a selective resistance marking method, and Fig. 2 is a schematic diagram of a modification of the relay disclosed in Fig. 1.

References KS1 and KS2 designate two selector switches, of which, for the sake of simplicity, only the rotary magnets DM1 and DM2 and the test wipers 01, 02 with the mark contacts tested by them are shown.

The mark contacts 1, 1' and 2, 3 are associated with different numerical groups corresponding to the numbers 1, 2 and 3 respectively. Corresponding contacts of KS1 and KS2 are multipled in a known manner and connected to contacts of switches (not shown) of the same group, thus forming the multiples *m1*, *m1'*, *m2* and *m3*.

Resistances R1', R1, R2 and R3 are connected respectively between each multiple and the negative terminal of battery B*a*.

The resistance of multiples corresponding to the same numeral (for example R1' and R1) are identical but different from the remaining resistances.

The adjustment of the switches KS1 and KS2 is controlled by registers R*eg*1 and R*eg*2. MS1 and MS2 designate marking switches, the outlet contacts 1, 2 and 3 of which are connected through resistances R11, R12 and R13, and R21, R22 and R23, respectively, to the negative terminal of battery B*a*. The resistances R11 and R21 are equal to resistances R1' and R1, the resistances R12 and R22 are equal to R2 and so on.

It is assumed that switches KS1 and KS2 are to be adjusted to an outlet designated 2 and 3 respectively. Under the control of the selecting signals the wipers of MS1 and MS2 are set to contacts 2 and 3 respectively.

The registers furthermore comprise differential relays D1 and D2 by means of which the values of the identification resistances of KS1 and KS2 are selectively tested. It will be obvious that instead of differential relays any other suitable device may be used. Thus, for example, when using Wheatstone bridges, for example, voltage testing devices may be used of the kind described in the copending U. S. applications, Serial No. 107,411, filed July 29, 1949, Serial No. 107,412, filed July 29, 1949, and Serial No. 120,248, filed October 8, 1949.

The adjustment of switch KS1 is effected as follows: After the marking switch MS1 has been set, the differential relay D1 is energized, so that the rotary magnet DM1 is energized and switch KS1 is actuated.

The current through the left hand winding of D1 is determined by the value of resistance R12 and is equal to $$I_{L_1}=\frac{E}{R_{12}+Ri}$$

where E designates the voltage of the batter B*a* and R*i* the resistance of the winding. Similarly, the current through the right-hand winding of D1 is equal to $$I_{R_1}=\frac{E}{R_x+Ri}$$

where $R_x$ designates the resistance tested at this instant.

As long as the test wiper is in contact with mark contacts connected to resistances unequal to resistance R12, the currents through the two windings of D1 are unequal and the relay remains energized. However, as soon as a contact of an outlet of the desired group 2 is found, the magnetisations of the two currents compensate one another and relay D1 is deenergized. The make contact opens and interrupts the circuit of DM1, due to which the switch stops.

The adjustment of KS2 takes place in an entirely similar manner.

However, if the wipers O1 and O2 are simultaneously in contact with corresponding mark contacts of the same multiple, for example contacts 1, the current through $R_1$ is distributed over the right hand windings of relays D1 and D2. The current through the right-hand winding of D1 is now equal to $$I_{R_1}=\frac{E}{2R_1+Ri}$$

If $2R_1$ is equal to R2, the current through the right-hand winding is equal to the nominal value of the current, which would occur on reaching an outlet of group 2. Relay D1 then becomes deenergized and the switch is adjusted to a marked outlet.

In order to avoid this risk, the resistances are, according to the invention, chosen such that the value of the highest identification resistance is smaller than twice the value of the lowest identification resistance. With this proportioning it is impossible that, during a simultaneous test, one mark is changed to another mark, since the current through a testing circuit during a simultaneous test is lower than the lowest current occurring during a separate test. Consequently, a selector switch cannot stop at the wrong outlet.

It may happen that a simultaneous test occurs when one of the switches reaches the correct desired outlet. In this event, the switch would move on.

There is little likelihood of a completely simultaneous test. If the resistance values are tested by electronic means, for example by means of circuits as described in the above-identified copending applications the test is carried out so rapidly that the switch is most likely to stop at one of the outlets of the desired group.

If the highest identification resistance is lower than twice the lowest identification resisstance, the difference between the nominal values of the successive current stages is comparatively small.

It has been found that the transition resistance between a moving wiper and a mark contact may assume comparatively high values of a variable nature. This transition resistance is inserted in the test circuit in series with the identification resistance and the internal resistance of the testing device. In order to minimize the effect of the transition resistance, identification resistances having comparatively high resistance values are required. In this event, however, trouble is experienced from the leakage resistance from the multiple to earth.

If the identification resistances are tested through preceding selector stages, leakage resistances are connected in parallel. The values of these leakage resistances in themselves are not constant, but vary with the hygrometric condition of the air, the temperature and so on.

According to the invention, these sources of interference are eliminated by making the internal resistance of the test circuit low relative to the lowest identification resistance, for example, lower than $1/10$ of this resistance. The result of these measures is that the potential of the tested multiple differs only slightly from earth potential and the leakage resistances are traversed by a very weak current only.

As shown in Fig. 2, advantageous use may be made of a modulating differential relay 10. This relay may, for example, be constructed as follows. The two windings 11 and 12 of the relay 10 are arranged on a ferromagnetic core 13, to which is also coupled the inductance 14 of a frequency-determining circuit of an oscillation generator 15. The oscillations of the generator 15 are passed through a filter 16 which passes only a narrow frequency band about the central frequency of the generator, the oscillations subsequently being rectified by device 17. The rectified current operates a sensitive test relay 18, a make contact 19 of which is included in the energizing circuit of the rotary magnet DM1 of the switch.

As long as the currents flowing through the relay windings 11 and 12 are unequal, the ferromagnetic core 13 is premagnetized and the frequency of the generator is unequal to the central frequency, so that the oscillations passing through the filter 16 are strongly damped. The rectified current is then low and the test relay 18 unmagnetized. However, if the currents through the input windings become equal, the test relay is energized and the selector stops.

What I claim is:

1. In an automatic signalling system, a selective marking arrangement comprising a group of selector switches each having a plurality of outlet contacts, an arm for scanning said contacts and means to actuate said arm, each set of corresponding contacts in said switches being interconnected to form a multiple, a plurality of impedances each of which is connected between a respective multiple and a common point of potential and having an absolute value characterizing the multiple, the absolute value of the highest impedance in said plurality thereof being lower than twice the absolute value of the lowest impedance, and a control device associated with each selector switch, said device including a test circuit coupled to said arm for selectively testing the contact voltage of the impedance connected to the outlet contact engaged by said arm, means for interrupting said arm actuating means to arrest the scanning thereof and means responsive to a contact voltage of a desired value to operate said interrupting means.

2. In an automatic signalling system, a selective marking arrangement comprising a group of selector switches each having a plurality of outlet contacts, a wiper contact for selectively engaging said outlet contacts and a rotary electromagnet for actuating said wiper contact, each set of corresponding outlet contacts in said switches being interconnected to form a multiple, a plurality of impedances each connected between a respective multiple and a common point of potential and having an obsolute value characterizing the associated multiple, the absolute value of the highest impedance in said plurality thereof being lower than twice the absolute value of the lowest impedance, a source of energizing potential for each electromagnet, a register associated with each selector switch, said register including a differential relay having two windings and a make contact connected in series with said electromagnet to said source, one of said windings being connected to said wiper contact of said selector switch, marking switch having a plurality of terminal contacts and a wiper arm for selectively engaging said terminal contacts, and a plurality of impedances each connected between a respective terminal contact of said marking switch and a common point of potential, said wiper arm being connected to the other winding of said relay.

3. An arrangement, as set forth in claim 2, wherein said differential relay includes a ferromagnetic core and an additional winding, an oscillator having a frequency determining circuit incorporating said additional winding, a band-pass filter coupled to the output of said oscillator, a rectifier coupled to the output of said filter to develop a control voltage depending on the deviation of the oscillator frequency from a central frequency of said band-pass filter, and a test relay responsive to said control voltage and including a make contact in series with said source and said electromagnet.

References Cited in the file of this patent

UNITED STATES PATENTS

| Number | Name | Date |
|---|---|---|
| 2,354,667 | Deakin et al. | Aug. 1, 1944 |
| 2,444,065 | Pouliart | June 29, 1948 |
| 2,454,781 | Deakin | Nov. 30, 1948 |